C. M. KOLBENSTETTER.
SECURING MEANS FOR SEPARABLE MEMBERS.
APPLICATION FILED AUG. 24, 1916.

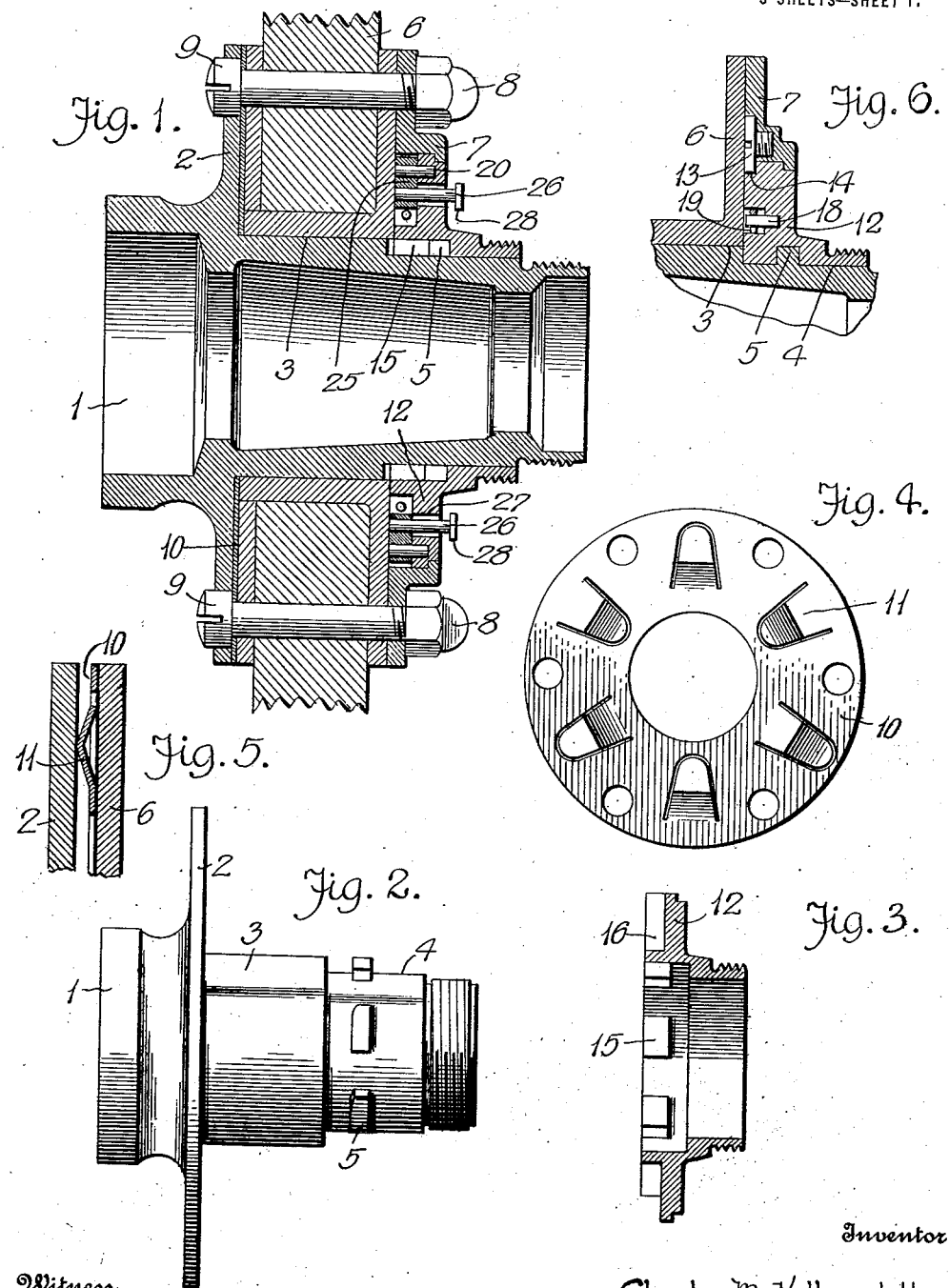

1,308,906.

Patented July 8, 1919.
3 SHEETS—SHEET 2.

Witness
Chas. W. Stauffiger
Anna M. Dorr.

Inventor
Charles M. Kolbenstetter,
By
Attorneys

C. M. KOLBENSTETTER.
SECURING MEANS FOR SEPARABLE MEMBERS.
APPLICATION FILED AUG. 24, 1916.

1,308,906.

Patented July 8, 1919.
3 SHEETS—SHEET 3.

Witness
Chas. W. Stauffiger
E. M. Benson

Inventor
Charles M. Kolbenstetter
By
Barthel & Barthel
Attorney

UNITED STATES PATENT OFFICE.

CHARLES M. KOLBENSTETTER, OF DETROIT, MICHIGAN.

SECURING MEANS FOR SEPARABLE MEMBERS.

1,308,906.  Specification of Letters Patent.  Patented July 8, 1919.

Application filed August 24, 1916. Serial No. 116,717.

*To all whom it may concern:*

Be it known that I, CHARLES M. KOLBENSTETTER, a citizen of the United States of America, residing at Detroit, in the county of Wayne and State of Michigan, have invented certain new and useful Improvements in Securing Means for Separable Members, of which the following is a specification, reference being had therein to the accompanying drawings.

This invention relates to securing means for separable members, and has special reference to interlocking members adapted to form part of a demountable wheel, said members being disclosed by my companion application filed under even date. In this companion application there is shown an inner hub member and interlocked with the inner hub member is a demountable hub member or spoke structure that may be easily and quickly mounted upon the inner hub member and as readily detached. Associated with the interlocked members is a securing means adapted to be actuated by a spanner wrench or suitable instrument, and as an improvement of the securing means shown in my companion application, there is illustrated and described in this application a securing means which is more positive in its action, easier to install and more efficient for the engageable and disengageable members of a demountable wheel.

In describing my invention with special reference to the members of a demountable wheel, it is to be understood that the securing means is applicable to any separable members, and particularly to members that are interlocked by partially rotating one member relative to the other.

Reference will now be had to the drawings, wherein

Figure 1 is a longitudinal sectional view of a demountable wheel structure including the separable members in accordance with my invention;

Fig. 2 is a side elevation of an inner hub member;

Fig. 3 is a longitudinal sectional view of a rotatable or outer member;

Fig. 4 is a front elevation of a release or ejector member;

Fig. 5 is a vertical sectional view of a portion of the member shown in Fig. 4, illustrating the manner in which it releases or ejects one member relative to the other;

Fig. 6 is a detail sectional view of a portion of a rotative outer member;

Figure 7:
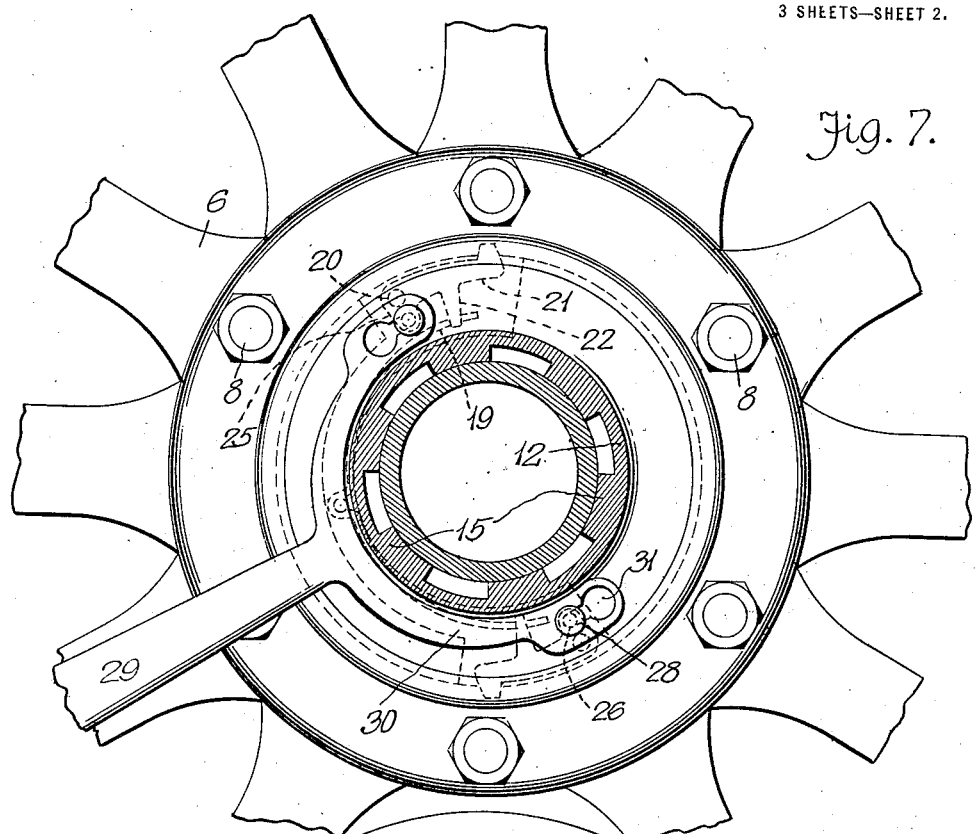
Fig. 7 is a side elevation of a portion of an artillery vehicle wheel, partly in section, and illustrating the use of a spanner wrench for releasing the securing means of separable members.
Figure 8:
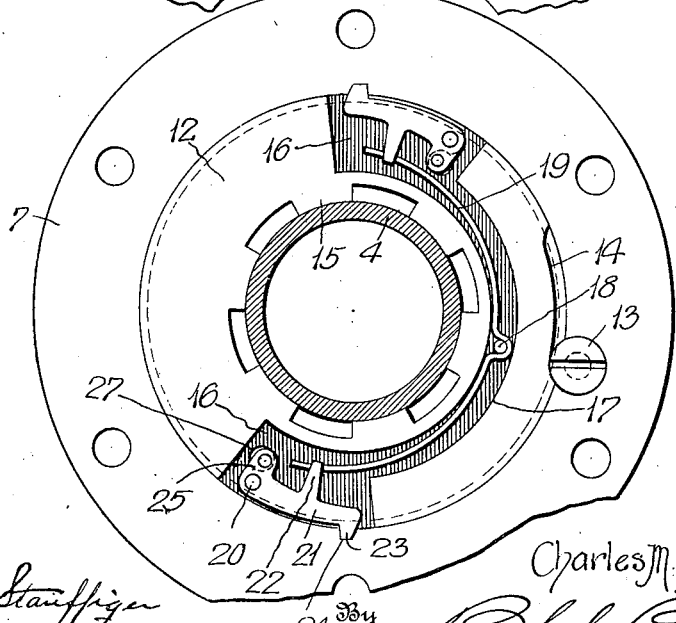
Fig. 8 is an elevation of the inner side of a rotatable or outer member, showing the securing mechanism.

In describing my invention by aid of the views above referred to, I desire it to be understood that the same are intended as merely illustrative of an example whereby my invention may be put into practice, and I do not care to confine my invention to the precise construction and arrangement of parts shown. The following description is therefore to be broadly construed as including such substitute constructions and arrangements of parts which are the obvious equivalents of those to be hereinafter referred to.

Reference will first be had to Figs. 1 to 8 inclusive wherein 1 denotes an inner member in the form of a hub member having a peripheral apertured flange 2, a bearing surface 3, and a reduced end 4 provided with spaced circumferentially disposed locking lugs 5.

6 denotes a demountable member having an annular retaining member or ring 7 and bolts 8, said bolts having heads 9 extending into the apertured peripheral flange 2 of the inner member 1. The demountable member 6 is placed upon the bearing 3 of the inner member 1 for rotative continuity therewith by reason of the bolt heads 9 extending into the flange 2 of said member.

10 denotes a release or ejector member in the form of a disk mounted on the bolts 8 and movable with the spoke structure 6. The member 10 has a plurality of outstruck resilient tongues 11 facing and bearing against the peripheral flange 2 of the inner member 1, said tongues being held under compression when the demountable member is locked on the inner member, but immediately upon the demountable member being held unlocked, the release or ejector member 10 forces the demountable member outwardly on the bearing 3 of the inner member to facilitate its removal.

12 denotes a rotatable securing member mounted in the retaining member 7, and having a rotative movement therein limited by a screw 13 carried by the retaining member 7 and extending into a segmental groove 14 in the face of the member 12. The rotative securing member is adapted to fit upon the reduced end 4 of the inner member 1 and said securing member has spaced inwardly projecting and circumferentially disposed lugs 15 adapted to interlock with the lugs 5 of the inner member. In placing the securing member 12 upon the inner member 1 the lugs 15 are adapted to pass between the lugs 5 of the inner member and by rotating the securing member 12, the lugs 15 are shifted behind the lugs 5 to prevent longitudinal displacement of the securing member relative to the inner member. The lugs 5 and 15 constitute interlocking means for the inner and securing members, and the elements thus far described form the subject matter of my companion application.

Reference will now be had to the securing means for preventing accidental rotation of the securing member 12 relative to the demountable member.

The inner face of the securing member 12 has diametrically opposed sector shaped recesses 16 connected by a semi-circular groove 17 and intermediate the ends of said groove is an anchor pin 18 for a semi-circular band spring 19, said spring having the ends thereof extending into the recesses 16.

Pivotally mounted in the recesses 16 by pins 20 are locking members 21, said members having extensions 22 to receive the ends of the spring 19, and teeth 23 to engage in notches 24 in the retaining ring 7. The teeth 23 are held normally in the notches 24 by the ends of the spring 19 and said teeth secure the securing member 12 against rotation relative to the retaining member 7 which member in turn is held against rotation relative to the demountable member 6 and inner member 1 by the bolts 8.

The pivoted ends of locking members 21 have short arms 25 provided with pins 26 extending outwardly through slots 27 in the securing member 12. The outer ends of the pins 26 are provided with heads 28, and a spanner wrench 29 is employed for releasing the locking means and partially rotating the member 12. The spanner wrench 29 has the arms 30 thereof provided with slots 31, said slots having enlarged ends to provide clearance for the heads 28 of the pins 26.

By placing the spanner wrench over the outer ends of the pin 26 and shifting said spanner wrench, the small ends of the slots 31 engage the pins 26 and shift said pins, thereby tilting the locking members 21 sufficiently to move the teeth 23 out of engagement with the retaining ring 7. Further movement of the spanner wrench partially rotates the member 12, and places the lugs 15 of said member in position to slide between the lugs 5 of the inner member, at which time the release or ejector member 10 shifts the demountable member 6 to facilitate further removal of the same.

Figure 9:
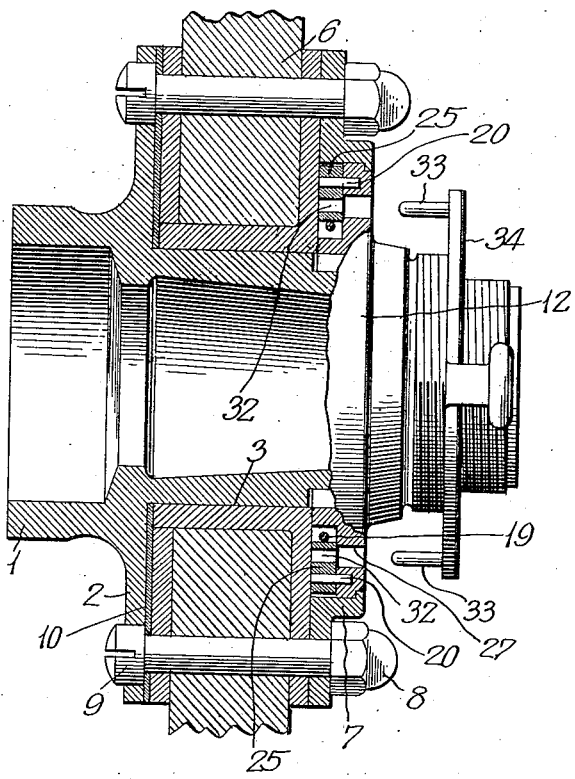
Fig. 9 is a sectional view of a portion of a wheel having separable members and illustrating a slight modification of the securing means.
Figure 10:
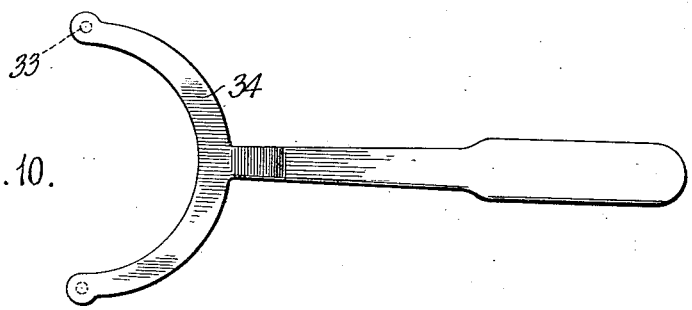
Fig. 10 is a plan of a spanner wrench adapted for the modified form of securing means shown in Fig. 9.
Figure 11:
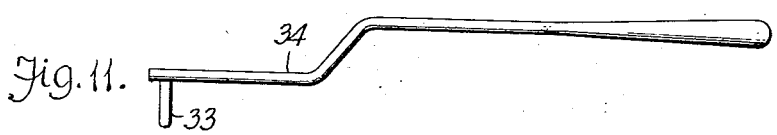
Fig. 11 is a side elevation of the spanner wrench.

In Figs. 9 to 11 inclusive, there is illustrated a slight modification of my invention, showing the pivoted locking members 21 as having openings 32 to receive pins 33 carried by a spanner wrench 34. This type of spanner wrench will tilt the locking members 21 to unlock the securing member 12 from the ring member 7, and at the same time the securing member 12 is partially rotated and made removable from the inner member.

What I claim is:—

1. The combination with inner and outer members, of a securing member for interlocking with said inner member by relative longitudinal and rotative movements, locking means for said securing member, comprising pivoted locking members carried by said securing member to engage the outer member and prevent rotation of said securing member relative to said outer member, pins carried by said locking members and extending through said securing member, and a spanner wrench adapted to engage said pins and successively turn said locking members upon their pivots to unlock the securing member and then partially rotate said securing member.

2. In a demountable wheel construction, an inner member, a demountable member on said inner member, a rotatable securing member carried by said demountable member and adapted to interlock with said inner member, locking members pivotally attached to and concealed within said securing member to swing in the plane of rotation of the wheel outwardly into engagement with said demountable member to hold said securing member against accidental rotation relative to said inner member, and a spanner wrench adapted to be engaged with said pivoted locking members and by a turning movement of said wrench to first turn said locking members out of engagement with the demountable member and by a further turning movement to turn said securing member through the medium of said locking members.

3. In a demountable wheel, an inner hub member, a demountable member having a notch, a rotatable securing member carried by said demountable member adapted by rotation relative thereto to secure the demountable member upon said inner member, said securing member being provided with a recess in the inner face, and a locking member pivotally mounted in said recess to swing radially outward into engagement with said notch in said demountable member, a spring to normally hold said locking member swung outwardly, and means for swinging said locking member inwardly against the action of said spring and thereafter turning said securing member through the engagement of said means with said locking member to disengage the same from said inner hub member.

4. In a demountable wheel, an inner hub member, a demountable member thereon having notches, a rotatable member carried by said demountable member to rotate relative thereto and interlock with said hub member by such relative rotation, locking dogs pivotally attached to said rotatable member to swing outwardly into engagement with said notches in said demountable member, a common spring for actuating said dogs to normally hold the same swung outwardly, and means for engaging and swinging said dogs inwardly upon initial turning movement of said means and for thereafter turning the rotatable member through the engagement of said means with said dogs.

5. In a demountable wheel, an inner hub member, a demountable member having notches, a rotatable securing member carried by said demountable member adapted by rotation to secure said demountable member on said inner member, said securing member being recessed at its inner side adjacent the demountable member and provided with openings therethrough, locking members in said recess and pivotally attached near one end to said securing member to swing outwardly into engagement with said notches in said demountable member, there being a single notch for each locking member, means in said recess common to all of said locking members adapted to normally hold said locking members turned outwardly and means for turning said locking members projecting through said openings and by engagement therewith turning said securing member.

6. In a demountable wheel, the combination of an inner hub member, a demountable member thereon, a securing member adapted to interlock with said inner member by a rotative movement of said securing member relative to the outer member, said securing member being recessed at its inner side adjacent the demountable member, a retaining ring on the demountable member secured thereto and loosely engaging the securing member, dogs pivoted near one end to said securing member within said recess and formed at their opposite ends to engage the demountable member by an outwardly swinging movement, means in said recess for yieldingly holding said dogs turned outwardly in engagement with the demountable member, and means to act upon said dogs at a distance from their pivots for turning said dogs inwardly out of engagement with the demountable member and to engage and turn the securing member, said means being arranged to have a limited turning movement relative to said securing member for swinging the dogs inwardly prior to turning the securing member.

In testimony whereof I affix my signature in the presence of two witnesses.

CHARLES M. KOLBENSTETTER.

Witnesses:
 ANNA M. DORR,
 KARL H. BUTLER.